(12) United States Patent
Kato et al.

(10) Patent No.: US 8,773,753 B2
(45) Date of Patent: Jul. 8, 2014

(54) OPTICAL AMPLIFIER AND OPTICAL AMPLIFYING APPARATUS

(75) Inventors: Tomoyuki Kato, Kawasaki (JP); Fumio Futami, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 522 days.

(21) Appl. No.: 12/987,602

(22) Filed: Jan. 10, 2011

(65) Prior Publication Data

US 2011/0176202 A1 Jul. 21, 2011

(30) Foreign Application Priority Data

Jan. 15, 2010 (JP) ................................. 2010-007389

(51) Int. Cl.
*G02F 1/39* (2006.01)
*G02F 1/365* (2006.01)

(52) U.S. Cl.
USPC ........................................ 359/337.2; 359/330

(58) Field of Classification Search
USPC ........................................ 359/330, 333, 337.2
See application file for complete search history.

(56) References Cited

U.S. PATENT DOCUMENTS

| | | | | |
|---|---|---|---|---|
| 3,655,993 | A | * | 4/1972 | Wolff ............................. 359/330 |
| 4,349,907 | A | * | 9/1982 | Campillo et al. ............... 372/92 |
| 5,274,495 | A | | 12/1993 | Shirasaki |
| 5,862,287 | A | | 1/1999 | Stock et al. |
| 6,359,914 | B1 | * | 3/2002 | Powers et al. .................... 372/25 |
| 6,728,273 | B2 | * | 4/2004 | Perry ............................. 372/18 |
| 6,791,743 | B2 | * | 9/2004 | Jovanovic et al. ............. 359/333 |
| 6,870,664 | B2 | * | 3/2005 | Jovanovic et al. ............. 359/333 |
| 7,164,526 | B2 | * | 1/2007 | McKinstrie et al. .......... 359/330 |
| 7,224,863 | B1 | * | 5/2007 | Li et al. ............................. 385/27 |
| 7,388,710 | B2 | * | 6/2008 | Ono et al. ....................... 359/330 |
| 7,630,418 | B2 | * | 12/2009 | Franjic et al. .................... 372/21 |
| 7,853,145 | B2 | | 12/2010 | Futami et al. |
| 8,049,956 | B2 | | 11/2011 | Kong et al. |
| 2003/0112493 | A1 | | 6/2003 | Jovanovic et al. |
| 2005/0063425 | A1 | * | 3/2005 | Krastev et al. ..................... 372/6 |
| 2009/0190207 | A1 | * | 7/2009 | Watanabe .................. 359/341.3 |
| 2011/0255874 | A1 | | 10/2011 | Watanabe |

FOREIGN PATENT DOCUMENTS

| | | |
|---|---|---|
| JP | 10-186424 A | 7/1998 |
| JP | 2008-139377 A | 6/2008 |
| JP | 2009-177641 A | 8/2009 |
| JP | 2009-543114 A | 12/2009 |
| WO | WO-92/05466 A1 | 4/1992 |

OTHER PUBLICATIONS

Dubietis, Audrius et al., "Trends in Chirped Pulse Optical Parametric Amplification", IEEE Journal of Selected Topics in Quantum Electronics, vol. 12, No. 2, Mar. 2006, pp. 163-172.

(Continued)

*Primary Examiner* — Eric Bolda
(74) *Attorney, Agent, or Firm* — Fujitsu Patent Center (57) ABSTRACT

An optical amplifier amplifies signal light and includes a pump light source that outputs pump light of a wavelength different from that of the signal light; a combining unit that combines the signal light and the pump light output by the pump light source, to output combined light; an amplifying unit that has non-linear optical media that transmit the combined light to amplify the signal light, the amplifying unit further removing, in the non-linear optical media, idler light generated from the signal light and the pump light, and outputting light that results; and an extraction filter that extracts the signal light from the light output by the amplifying unit.

14 Claims, 9 Drawing Sheets

(56) References Cited

OTHER PUBLICATIONS

Ho, Min-Chen et al.,"200-nm-Bandwidth Fiber Optical Amplifier Combining Parametric and Raman Gain", J. Lightwave Technol., vol. 19, Jul. 2001, pp. 977-981.

Tong, Z et al., "Measurement of Sub-1dB Noise Figure in a Non-Degenerate Cascaded Phase-Sensitive Fiber Parametric Amplifier", 35th European Conference on Optical Communication Sep. 20, 2009, Paper 1.1.2.

Torounidis, Thomas et al., "Fiber-Optical Parametric Amplifier With 70-dB Gain", IEEE Photon. Technol. Letter, vol. 18, May 15, 2006, pp. 1194-1196.

Wong, Kenneth K. et al., "Polarization-Independent One-Pump Fiber-Optical Parametric Amplifier", IEEE Photonics Technology Letters, vol. 14, No. 11 Nov. 2002, pp. 1506-1508.

Japanese Office Action mailed Aug. 6, 2013 for corresponding to Japanese Application No. 2010-007389, with Partial English-language Translation.

JPOA—Office Action of Japan Patent Application 2010-007389 dated May 13, 2014 with English translation of the relevant part, p. 1, line 1 to p. 2, line 28 of the Office Action.

* cited by examiner

OPTICAL AMPLIFIER AND OPTICAL AMPLIFYING APPARATUS

This application is based upon and claims the benefit of priority of the prior Japanese Patent Application No. 2010-007389, filed on Jan. 15, 2010, the entire contents of which are incorporated herein by reference.

FIELD

The embodiments discussed herein are related to an optical amplifier and optical amplifying apparatus.

BACKGROUND

Conventional technologies for amplifying signal light include erbium doped fiber amplifiers (EDFAs) and optical parametric amplifiers (OPAs) employing a non-linear optical medium. The EDFAs have a gain band that is dependent on a doped rare-earth element (Er). By contrast, the optical parametric amplifier, whose gain band is secured by adjusting a zero-dispersion wavelength of an optical fiber, is capable of obtaining a wide gain bandwidth (see, e.g., Ho, M-C., et al, "200-nm-Bandwidth Fiber Optical Amplifier Combining Parametric and Raman Gain," J. Lightw. Technol, 19, pp. 977-981, 2001) and a high gain volume (see, e.g., Torounidis, Thomas, et al, "Fiber-Optical Parametric Amplifier With 70-dB Gain," IEEE Photon. Technol. Lett, 18, pp 1194-1196, 2006). The optical parametric amplifier is capable of realizing a low noise figure (see, e.g., Tong, C., et al., "Measurement of Sub-1 dB Noise Figure in a Non-Degenerate Cascaded Phase-Sensitive Fibre Parametric Amplifier," 35th European Conference on Optical Communication, Paper 1.1.2, 2009).

The EDFA, which amplifies the signal light by a stimulated emission process having a relatively slow relaxation time, does not change the waveform of the signal light even in the range of input power with gain saturation. By contrast, the optical parametric amplifier, which amplifies the signal light by a high-speed parametric process, produces a non-linear output relative to the intensity of the signal light waveform in the range of input power with gain saturation and therefore, can be used as a waveform shaper as well.

The optical parametric amplification is realized by combining the signal light and pump light of a wavelength near the zero-dispersion wavelength of the non-linear optical medium and inside the non-linear optical medium, amplifies the signal light by the optical parametric process. The optical parametric amplifier is provided with, for example, the pump light of a wavelength different from that of the signal light; an optical coupler that combines the signal light and the pump light; the non-linear optical medium; and an optical filter that takes out the signal light.

The conventional technologies described above, however, optical signals which are allocated at an anomalous dispersion wavelength of the non-linear optical medium is deteriorated by increase of its noise due to the phenomenon of modulation instability (non-linear optical effect). This causes a problem in that noise increases and the signal quality deteriorates at the time the signal light is amplified. The increase in noise caused by the optical parametric amplification will be specifically described.

Figure 8A:
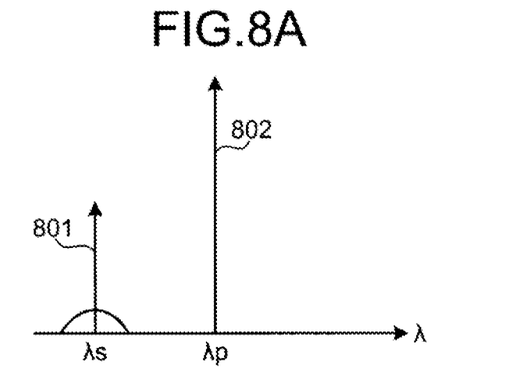
FIGS. 8A to 8D depict an increase in noise due to optical parametric amplification.

FIGS. 8A to 8D depict an increase in noise due to optical parametric amplification. In FIGS. 8A to 8D, the horizontal axis represents the wavelength ($\lambda$) and the vertical axis represents the optical power. As depicted in FIG. 8A, in the optical parametric amplifier, signal light 801 and pump light 802, respectively of wavelengths differing from each other, are combined and input to the non-linear optical medium. A wavelength $\lambda s$ represents the wavelength of the signal light 801. A wavelength $\lambda p$ represents the wavelength of the pump light 802.

Figure 8B:
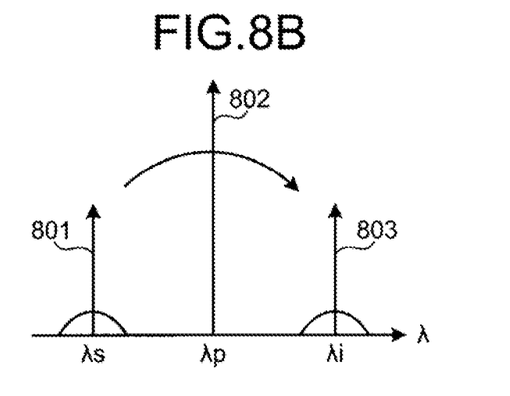
Figure 8C:
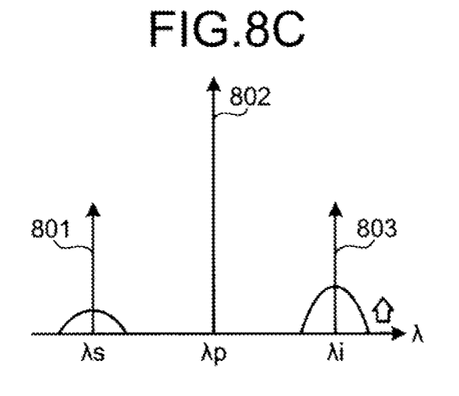

As depicted in FIG. 8B, when the signal light 801 and the pump light 802 are input to the non-linear optical medium, idler light 803 is generated by four-wave mixing as a high-order effect. Wavelength $\lambda i$ represents the wavelength of the idler light 803. Since the wavelength $\lambda i$ of the idler light 803 is the anomalous dispersion wavelength, the noise of the idler light 803 increases, as depicted in FIG. 8C.

Figure 8D:
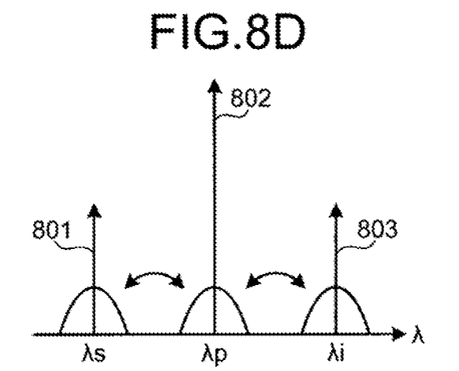

For this reason, the idler light 803 having increased noise modulates the intensity of the pump light 802 and the pump light 802 comes to have great noise, as depicted in FIG. 8D. The pump light 802 having great noise modulates the intensity of the signal light 801 and therefore, the noise of the signal light 801 increases. Thus, since the optical parametric amplification generates the idler light 803 in a non-linear optical medium, the noise of the signal light 801 increases due to modulation instability (non-linear optical effect).

SUMMARY

According to an aspect of an embodiment, an optical amplifier amplifies signal light and includes a pump light source that outputs pump light of a wavelength different from that of the signal light; a combining unit that combines the signal light and the pump light output by the pump light source, to output combined light; an amplifying unit that has non-linear optical media that transmit the combined light to amplify the signal light, the amplifying unit further removing, in the non-linear optical media, idler light generated from the signal light and the pump light, and outputting light that results; and an extraction filter that extracts the signal light from the light output by the amplifying unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings. In a non-linear optical medium that performs optical parametric amplification, the disclosed optical amplifier and optical amplifying apparatus remove idler light, thereby reducing the idler light in the light to be amplified by the non-linear optical medium and amplifying signal light while preventing its deterioration.

Figure 1:
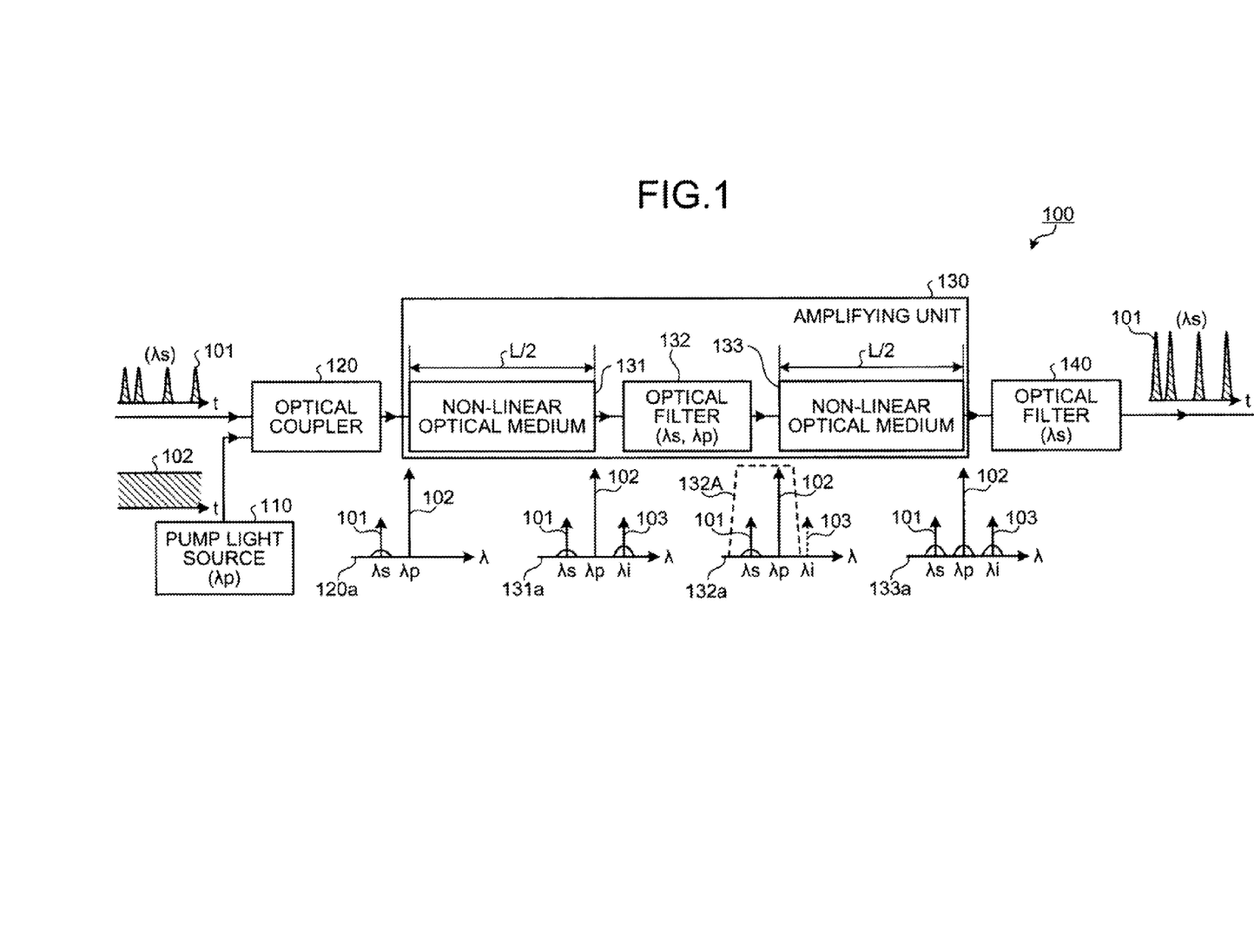
FIG. 1 depicts an optical amplifier according to a first embodiment.

FIG. 1 depicts the optical amplifier according to a first embodiment. In FIG. 1, numerical reference 101 and 102 represent signal light and pump light, respectively, where the horizontal axis in the figure represents time (t). As depicted in FIG. 1, an optical amplifier 100 according to the first embodiment is equipped with a pump light source 110, an optical coupler 120, an amplifying unit 130, and an optical filter 140. The optical amplifier 100 performs optical parametric amplification of the signal light 101 input from a communication line upstream. The signal light 101 is, for example, an intensity-modulated Return to Zero (RZ) signal. The wavelength of the signal light is given as wavelength $\lambda s$.

The pump light source 110 generates and outputs to the optical coupler 120, the pump light 102. The pump light 102 is pump light of a wavelength different from that of the signal light 101. The wavelength of the pump light 102 is given as wavelength $\lambda p$. The pump light 102 is, for example, continuous wave (CW) light.

The optical coupler 120 is a combining unit that combines the signal light 101 and the pump light 102, outputting the resulting combined light to the amplifying unit 130. Numerical reference 120a represents the light output from the optical coupler 120, where in the figure, the horizontal axis represents the wavelength ($\lambda$) and the vertical axis represents the optical power (the same applies for numerical references 131a, 132a, and 133a). As depicted with respect to numerical reference 120a, the light output from the optical coupler 120 includes the signal light 101 and the pump light 102.

The amplifying unit 130 has non-linear optical media 131 and 133 that transmit the light output from the optical coupler 120 and is an amplifying unit that removes the idler light generated from the signal light 101 and the pump light 110 in the non-linear optical media 131 and 133. Specifically, the amplifying unit 130 is equipped with the non-linear optical medium 131, an optical filter 132, and the non-linear optical medium 133.

Here, the total length of the non-linear optical media is given as L to amplify, at a desired gain in the amplifying unit 130, the signal light 101 included in the light output from the optical coupler 120. In this case, the length of each non-linear optical media 131 and 133 is designed so that both lengths total L. For example, each length of the non-linear optical media 131 and 133 is L/2.

The non-linear optical medium 131 is a first non-linear optical medium that transmits the light from the optical coupler 120 to the optical filter 132. Numerical reference 131a indicates the light output from the non-linear optical medium 131. As depicted by numerical reference 131a, the light output from the non-linear optical medium 131 includes the signal light 101, the pump light 102, and idler light 103. The idler light 103 is generated by the four-wave mixing of the non-linear optical medium 131 due to the signal light 101 and the pump light 102. The wavelength of the idler light 103 is given as wavelength $\lambda i$. The wavelength $\lambda i$ can be expressed, for example, as wavelength $\lambda i = 2\lambda p - \lambda s$ using the wavelength $\lambda s$ and the wavelength $\lambda p$.

The optical filter 132 transmits and outputs to the non-linear optical medium 133, the signal light 101 and the pump light 102 included in the light output from the non-linear optical medium 131. The optical filter 132 is a rejection filter that removes the idler light 103 included in the light output from the non-linear optical medium 131 without transmitting the removed idler light 103. For example, an optical bandpass filter such as a multilayer film filter may be used for the optical filter 132.

The light output from the optical filter 132 includes the signal light 101 and the pump light 102 but does not include the idler light 103. The band transmission characteristics 132A of the optical filter 132 are designed so that the wavelength $\lambda s$ of the signal light 101 and the wavelength $\lambda p$ of the pump light 102 will be transmitted and the wavelength $\lambda i = 2\lambda p - \lambda s$ of the idler light 103 will not be transmitted.

The non-linear optical medium 133 is a second non-linear optical medium that transmits and outputs to the optical filter 140, the light output from the optical filter 132. Numerical reference 133a indicates the light output from the non-linear optical medium 133. As depicted by numerical reference 133a, the light output from the non-linear medium 133 includes the signal light 101, the pump light 102, and the idler light 103.

The light output from the non-linear optical medium 133 includes the idler light 103 generated by the four-wave mixing of the non-linear optical medium 133. The idler light 103, which is generated in the non-linear optical medium 133 of L/2 length, is smaller than, for example, idler light generated in a non-linear optical medium of length L.

The amplifying unit 130 is implemented, for example, by forming the non-linear optical medium 131, the optical filter 132, and the non-linear optical medium 133 separately and combining the formed components together. The amplifying unit 130 may alternatively be implemented by partially forming, in the non-linear optical medium, a Bragg grating to remove the idler light 103. In this case, ends of the non-linear optical medium respectively correspond to the non-linear optical medium 131 and the non-linear optical medium 133 and the part of the non-linear optical medium in which the Bragg grating is formed corresponds to the optical filter 132.

Each of the non-linear optical media 131 and 133 can be implemented by an optical fiber of an average zero dispersion wavelength matching or substantially matching the wavelength of the pump light 102. Each of the non-linear optical media 131 and 133 can be alternatively implemented by periodically-poled lithium niobate of the average zero-dispersion wavelength matching or substantially matching the wavelength of the pump light 102.

The optical filter 140 is an extraction filter that transmits and outputs downstream, the signal light 101 included in the light output from the amplifying unit 130. The optical filter 140 does not transmit the pump light 102 or the idler light 103 included in the light output from the amplifying unit 130. This makes it possible to extract and output the signal light 101 amplified by the amplifying unit 130.

Thus, according to the optical amplifier 100 of the first embodiment, the idler light 103 generated in the non-linear optical medium 131 can be removed by the optical filter 132 between the non-linear optical media 131 and 133. Removal of the idler light 103 in between the non-linear optical media 131 and 133 (in the non-linear optical medium) makes it possible to perform the optical parametric amplification without the idler light 103 generated in the non-linear optical medium 131, thereby making it possible to suppress increased noise caused by the idler light in the non-linear optical medium 133 and amplify the signal light 101 without deterioration.

Since interaction between the signal light 101 and the pump light 102 is maintained even after the removal of the idler light 103 by the optical filter 132, sufficient gain can be obtained. For example, gain equivalent to that in the case of using the non-linear optical medium of L length can be obtained at the amplifying unit 130. Since the optical filter 132 transmits the signal light 101, the gain band is not narrowed and a sufficient gain band can be obtained at the amplifying unit 130.

Although FIG. 1 describes a configuration in which two non-linear optical media (non-linear optical media 131 and 133) are used, three or more non-linear optical media may be used. In this case, the optical filter to remove the idler light 103 may be disposed in each space between the non-linear optical media, making it possible to frequently remove the idler light 103 in non-linear optical medium and perform the optical parametric amplification with the idler light 103 lessened, whereby the signal light can be amplified without further deterioration.

Figure 2:
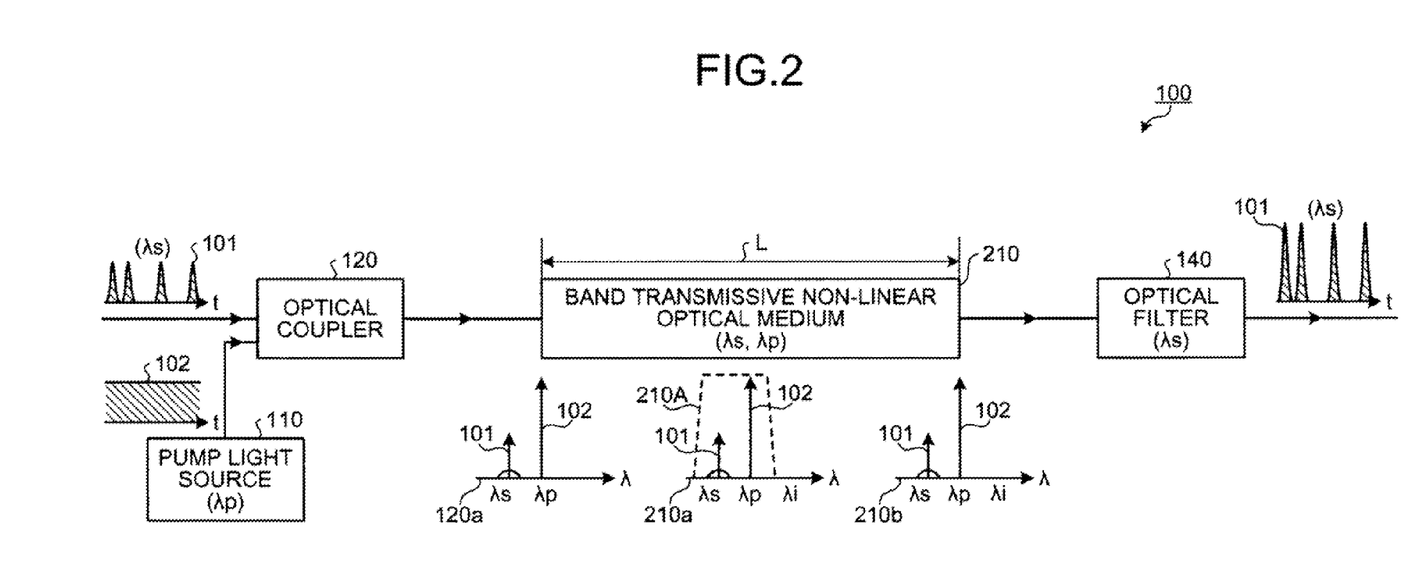
FIG. 2 depicts the optical amplifier according a second embodiment.

FIG. 2 depicts the optical amplifier according a second embodiment. In FIG. 2, components identical to those in FIG. 1 are omitted from the description and given the same numerical references used in FIG. 1. As depicted in FIG. 2, the optical amplifier 100 according to the second embodiment is equipped with a band transmissive non-linear optical medium 210 in place of the amplifying unit depicted in FIG. 1. The optical coupler 120 outputs to the band transmissive non-linear optical medium 210, the light obtained by combining the signal light 101 and the pump light 102.

The band transmissive non-linear optical medium 210 is a non-linear optical medium having band transmission characteristics that transmit the signal light 101 and the pump light 102 to the optical filter 140 and do not transmit the idler light 103. The band transmissive non-linear optical medium 210 can be implemented, for example, by forming the Bragg grating over the entire non-linear optical medium. The band transmissive non-linear optical medium 210 can be implemented alternatively by a non-linear optical medium having the band transmission characteristics of, for example, a photonic crystal fiber.

The light 210a transmitted by the band transmissive non-linear optical medium 210 includes the signal light 101 and the pump light 102. Although the idler light 103 (see FIG. 1) is generated in the band transmissive non-linear optical medium 210, the band transmissive non-linear optical medium 210 has the band transmission characteristics 210A that do not transmit the idler light 103.

Therefore, the light transmitted by the band transmissive non-linear optical medium 210 does not include the idler light 103; the light 210b output from the band transmissive non-linear optical medium 210 includes the signal light 101 and the pump light 102 and does not include the idler light 103.

Thus, according to the optical amplifier 100 of the second embodiment, the idler light 103 generated in the process of the optical parametric amplification can be removed by using the band transmissive non-linear optical medium 210 having the band transmission characteristics that do not transmit the idler light 103. The optical parametric amplification can be performed without the idler light 103 in the band transmissive non-linear optical medium 210 by removing the idler light 103 by the band transmissive non-linear optical medium 210 (in the midst of the non-linear optical medium), making it possible to suppress increased noise caused by the idler light in the band transmissive non-linear optical medium 210 and to amplify the signal light 101 without deterioration.

Figure 3:
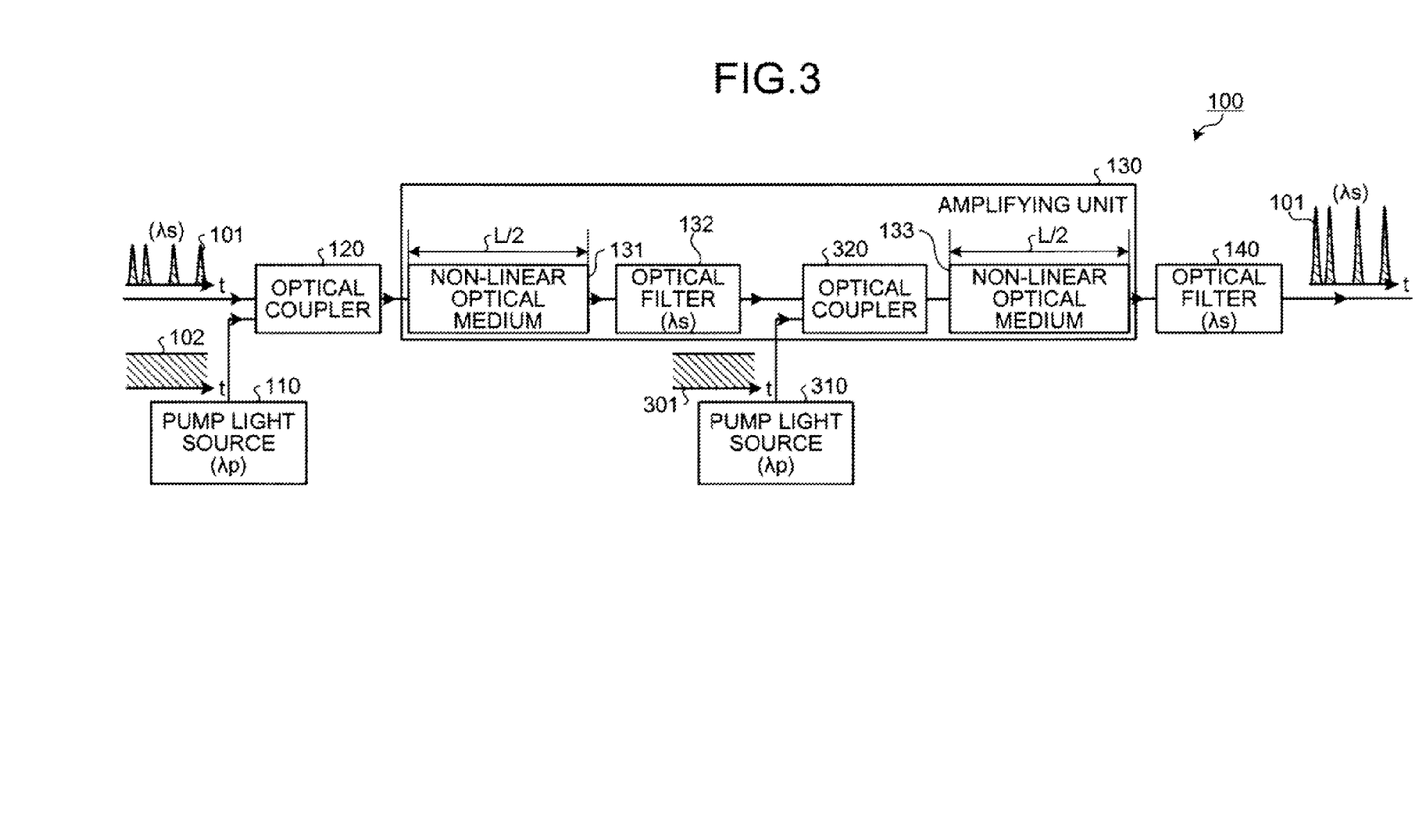
FIG. 3 depicts the optical amplifier according a third embodiment.

FIG. 3 depicts the optical amplifier according a third embodiment. In FIG. 3, components identical to those in FIG. 1 are omitted from the description and given the same numerical references used in FIG. 1. The optical amplifier 100 according to the third embodiment is configured by connecting multi-stages of the optical parametric amplifier. Specifically, as depicted in FIG. 3, the optical amplifier 100 according to the third embodiment is equipped with a pump light source 310 and an optical coupler 320 in addition to the configuration depicted in FIG. 1.

The optical filter 132 of the amplifying unit 130 transmits and outputs to the optical coupler 320, the signal light 101 included in the light output from the non-linear optical medium 131. The optical filter 132 does not transmit but rather removes the pump light 102 and the idler light 103 included in the light output from the non-linear optical medium 131. The pump light source 310 is a second pump light source that generates pump light 301 of a wavelength different from that of the signal light 101 and outputs the generated pump light 301 to the optical coupler 320. The pump light 301 is, for example, CW light. Here, the wavelength of the pump light 301 is determined to be $\lambda p$, the same wavelength as that of the pump light 102.

The optical coupler 320 is disposed downstream from the non-linear optical medium 131 of the amplifying unit 130. The signal light 101 from the optical filter 132 and the pump light 301 from the pump light source 310 are input to the optical coupler 320. The optical coupler 320 is a second combining unit that combines the signal light 101 and the pump light 301 and outputs the resulting combined light to the non-linear optical medium 133. The non-linear optical medium 133 transmits and outputs to the optical filter 140, the light output from the optical coupler 320.

Thus, according to the optical amplifier 100 of the third embodiment, the pump light 102 and the idler light 103 can be removed by the optical filter 132 and the pump light 301 can be input to the non-linear optical medium 133 by the pump light source 310 and the optical coupler 320. Since this enables optical parametric amplification to be performed in the non-linear optical medium 133, even if the pump light 102 is removed by the optical filter 132, the same effect can be obtained as that of the optical amplifier 100 according to the first embodiment.

Since the optical filter 132 has band transmission characteristics that do not transmit the pump light 102 or the idler light 103, the optical filter 132 has the same band transmission characteristics as those of the optical filter 140, making it possible to efficiently manufacture the optical filters 132 and 140 and reduce respective manufacturing costs. The pump light sources 110 and 310 may be implemented by separate light sources or may be implemented by one light source.

Although FIG. 3 describes a configuration in which two non-linear optical media (non-linear optical media 131 and 133) are used, three or more non-linear optical media may be used. In this case, the optical filter 132, the pump light source 310, and the optical coupler 320 are disposed in each space between the non-linear optical media, making it possible to frequently remove the idler light 103 in the non-linear optical medium and perform the optical parametric amplification with the idler light 103 lessened, whereby the signal light can be amplified without further deterioration.

Although a configuration has been described where the wavelength of the pump light 301 has the same wavelength as that of the pump light 102, $\lambda p$, the pump light 301 may have any wavelength so long as the wavelength is different from the wavelength $\lambda s$ of the signal light 101. For example, when the wavelength of the pump light 301 is set at wavelength $\lambda p2$ ($\neq \lambda s$, $\lambda p$), at the optical filter 140, the band transmission characteristics are set so that the wavelength $\lambda p2$ and the idler light 103 will be removed. This enables the signal light 101 to be extracted at the optical filter 140, even if the wavelength of the pump light 301 is set at wavelength $\lambda p2$.

Figure 4:
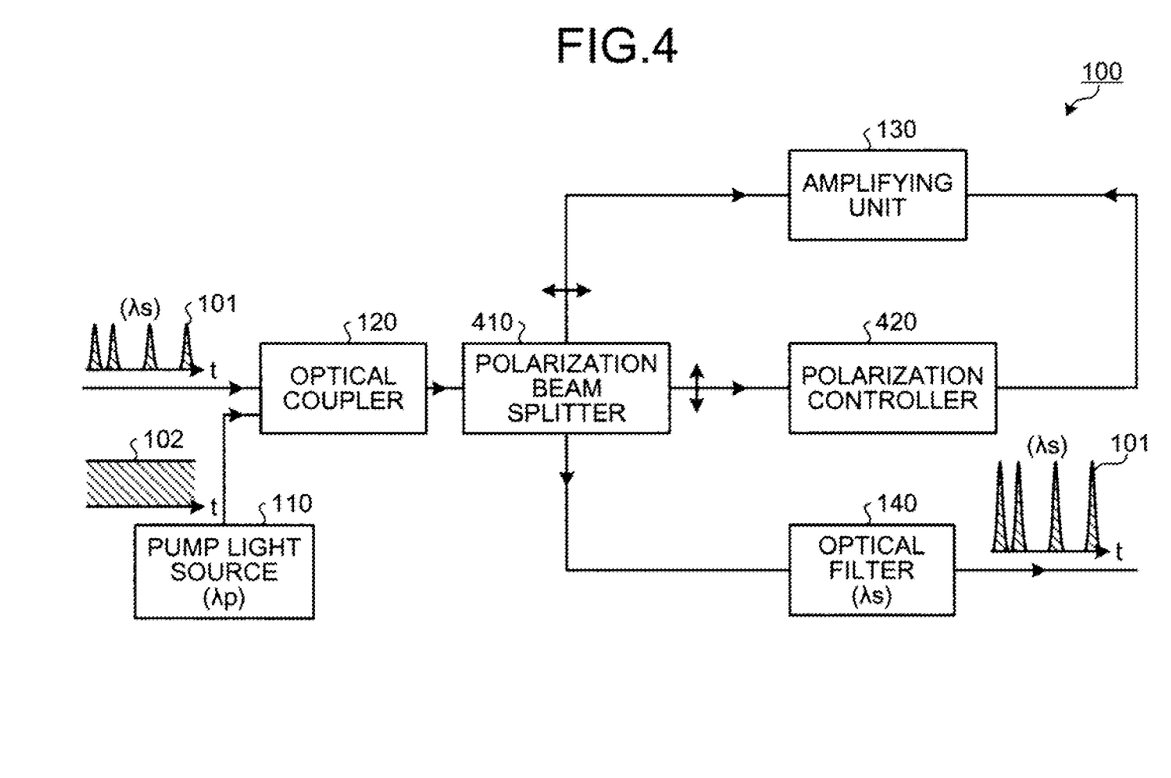
FIG. 4 depicts the optical amplifier according a fourth embodiment.

FIG. 4 depicts the optical amplifier according a fourth embodiment. In FIG. 4, components identical to those in FIG.

1 are omitted from the description and given the same numerical references used in FIG. 1. As depicted in FIG. 4, the optical amplifier 100 according to the fourth embodiment is equipped with a polarization beam splitter 410 and a polarization controller 420 in addition to the configuration depicted in FIG. 1. The optical coupler 120 outputs to the polarization beam splitter 410, the light obtained by combining the signal light 101 and the pump light 102.

The polarization beam splitter 410 splits the light output from the optical coupler 120 according to its state of polarization. For example, the polarization beam splitter 410 splits the light into a horizontally-polarized wave and a vertically-polarized wave. The polarization beam splitter 410 outputs the light of the horizontally-polarized wave to the amplifying unit 130 and at the same time, outputs the light of the vertically-polarized wave to the polarization controller 420. The polarization beam splitter 410 combines the light of the vertically-polarized wave output from the polarization controller 420 and the light of the horizontally-polarized wave output from the amplifying unit 130 and outputs the resulting combined light to the optical filter 140.

The amplifying unit 130 is, for example, the amplifying unit 130 depicted in FIG. 1. The amplifying unit 130 transmits and amplifies the light of the horizontally-polarized wave output from the polarization beam splitter 410 and outputs the amplified light to the polarization controller 420. Further, the amplifying unit 130 transmits and amplifies the light of the vertically-polarized wave output from the polarization controller 420 and outputs the amplified light to the polarization beam splitter 410.

Thus, the optical parametric amplification can be performed at the amplifying unit 130 irrespective of the polarization state of the signal light 101 by arranging a polarization diversity loop whereby the light split by polarized wave is transmitted in opposite directions at the amplifying unit 130. The optical amplifier 100 is not limited to the amplifying unit 130 depicted in FIG. 1 and may employ the band transmissive non-linear optical medium 210 depicted in FIG. 2 or the amplifying unit 130 and the pump light source 310 depicted in FIG. 3.

Concerning a polarization diversity loop configuration, the teachings of Wong, K. K. Y., et al, "Polarization-Independent One-Pump Fiber-Optical Parametric Amplifier," IEEE Photon. Technol. Lett, 14, pp. 1506-1509, 2002 may be adopted.

The polarization controller 420 executes control so that the polarization of the light of the horizontally-polarized wave output from the amplifying unit 130 will be constant and outputs the polarization-controlled light to the polarization beam splitter 410. Further, the polarization controller 420 executes control so that the polarization of the light of the vertically-polarized wave output from the polarization beam splitter 410 will be constant and outputs the polarization-controlled light to the amplifying unit 130.

This makes it possible to execute control so that the polarization of the lights input to the polarization beam splitter 410 from the amplifying unit 130 and the polarization controller 420 will be constant and to accurately output the light combined at the polarization beam splitter 410 to the optical filter 140.

Thus, according to the optical amplifier 100 of the fourth embodiment, the optical parametric amplification at the amplifying unit 130 can be made polarization-independent by arranging the polarization diversity loop employing the polarization beam splitter 410, thereby enabling the signal light 101 to be amplified without deterioration, even if the polarization state of the input signal light 101 is not controlled.

The light combined at the polarization beam splitter 410 can be output accurately to the optical filter 140 by the polarization controller 420 executing control so that the polarization of the light of each polarized wave will be constant. This makes it possible to amplify the signal light 101 without deterioration while preventing optical loss at the polarization beam splitter 410.

Figure 5:
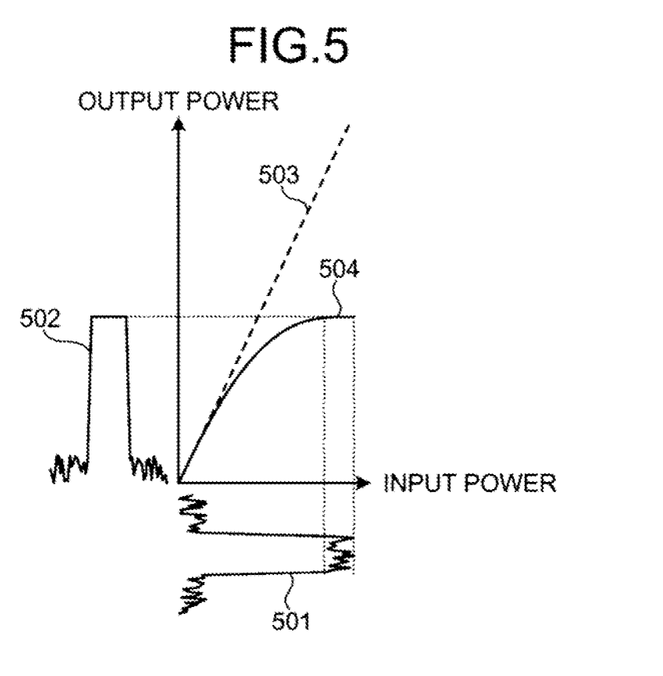
FIG. 5 depicts a graph of gain saturation characteristics by optical parametric amplification.

FIG. 5 depicts a graph of gain saturation characteristics by the optical parametric amplification. In FIG. 5, the horizontal axis represents input power to the optical amplifier 100. The vertical axis represents output power from the optical amplifier 100. An input optical pulse 501 indicates one example of an optical pulse input to the optical amplifier 100. An output optical pulse 502 indicates one example of the optical pulse output from the optical amplifier 100.

The optical amplifier 100 amplifies the signal light 101 by the optical parametric amplification. Therefore, the optical amplifier 100 has gain saturation characteristics 504 whereby the output power saturates as the input power increases instead of linear gain characteristics 503 whereby the output power is proportionate to the input power. This enables the optical amplifier 100 to be applied also to an optical limiter device that performs optical limiter amplification using the gain saturation characteristics 504. According to the optical limiter device to which the optical amplifier 100 is applied, the signal light 101 can be amplified and shaped without deterioration.

Figure 6:
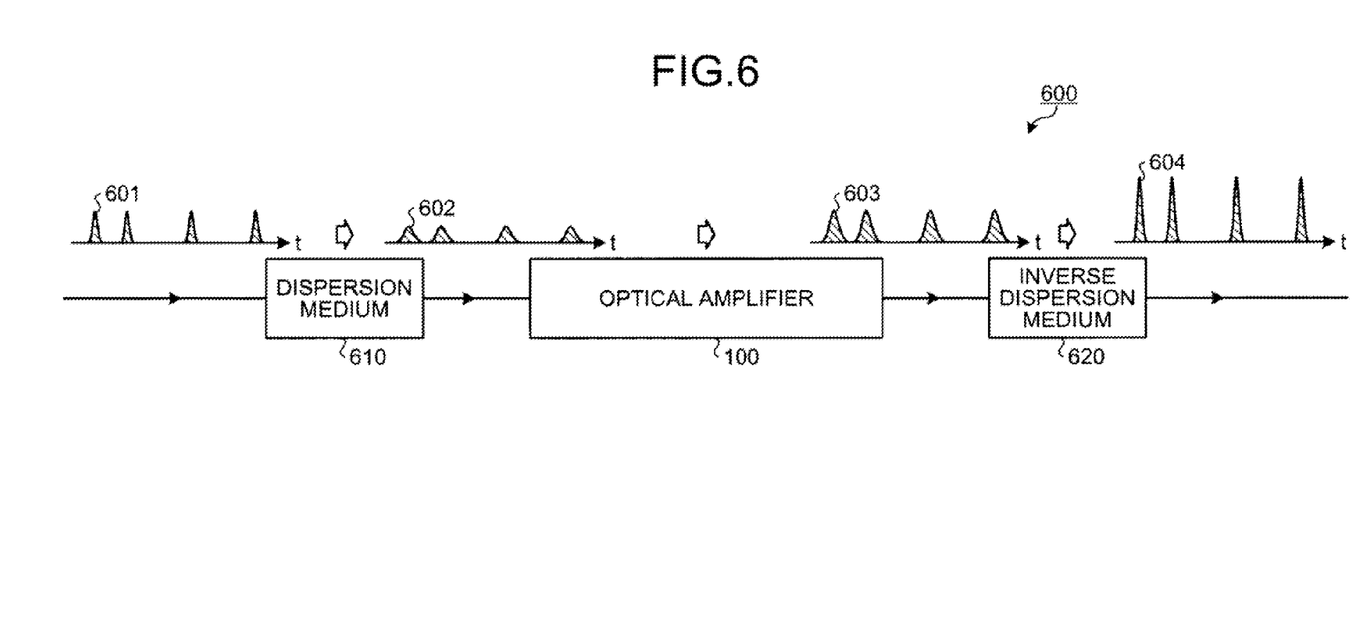
FIG. 6 depicts an optical amplifying apparatus according to a fifth embodiment.

FIG. 6 depicts the optical amplifying apparatus according to a fifth embodiment. Numerical references 601 to 604 in FIG. 6 represent signal light, where the horizontal axis in the figure represents time (t). As depicted in FIG. 6, an optical amplifying apparatus 600 according to the fifth embodiment is equipped with a dispersion medium 610, the optical amplifier 100, and an inverse dispersion medium 620. The signal light 601 output from a communication line upstream is input to the dispersion medium 610. The dispersion medium 610 has predetermined dispersion characteristics. The dispersion medium 610 transmits and outputs to the optical amplifier 100, the signal light 601.

The signal light 602 output from the dispersion medium 610 has a longer pulse duration and a lower peak than those of the signal light 601 due to dispersion characteristics of the dispersion medium 610. The optical amplifier 100 amplifies the signal light 602 output from the dispersion medium 610. The optical amplifier 100 outputs the amplified signal light 603 to the inverse dispersion medium 620. The optical amplifier 100 according to each embodiment described above can be applied as the optical amplifier 100.

The inverse dispersion medium 620 is a dispersion medium having dispersion characteristics inverse to those of the dispersion medium 610. The inverse dispersion medium 620 transmits and outputs downstream, the signal light 603 output from the optical amplifier 100. The signal light 604 output from the inverse dispersion medium 620 has a shortened pulse duration and a higher peak due to the dispersion characteristics of the inverse dispersion medium 620.

Thus, the optical chirped-pulse amplification can be performed in which the pulse width of the signal light 601 is expanded by the dispersion medium 610, the signal light 602 having the expanded pulse width is amplified by the optical amplifier 100, and the pulse width of the amplified signal light 603 is compressed to the original state by the inverse dispersion medium 620. This enables the signal light 601 to be amplified without further deterioration.

As an example of optical chirp amplification, the teachings of Dubietis, A., et al, "Trends in Chirped Pulse Optical Parametric Amplification," IEEE, J. Sel. Topics Quantum Electron, 12, pp. 163-172, 2006 is applicable.

Thus, according to the optical amplifying apparatus 600 of the fifth embodiment, the effect of the optical amplifier 100 according to each embodiment described above can be obtained and the signal light 601 can be amplified without further deterioration by the optical chirped-pulse amplification.

Figure 7:
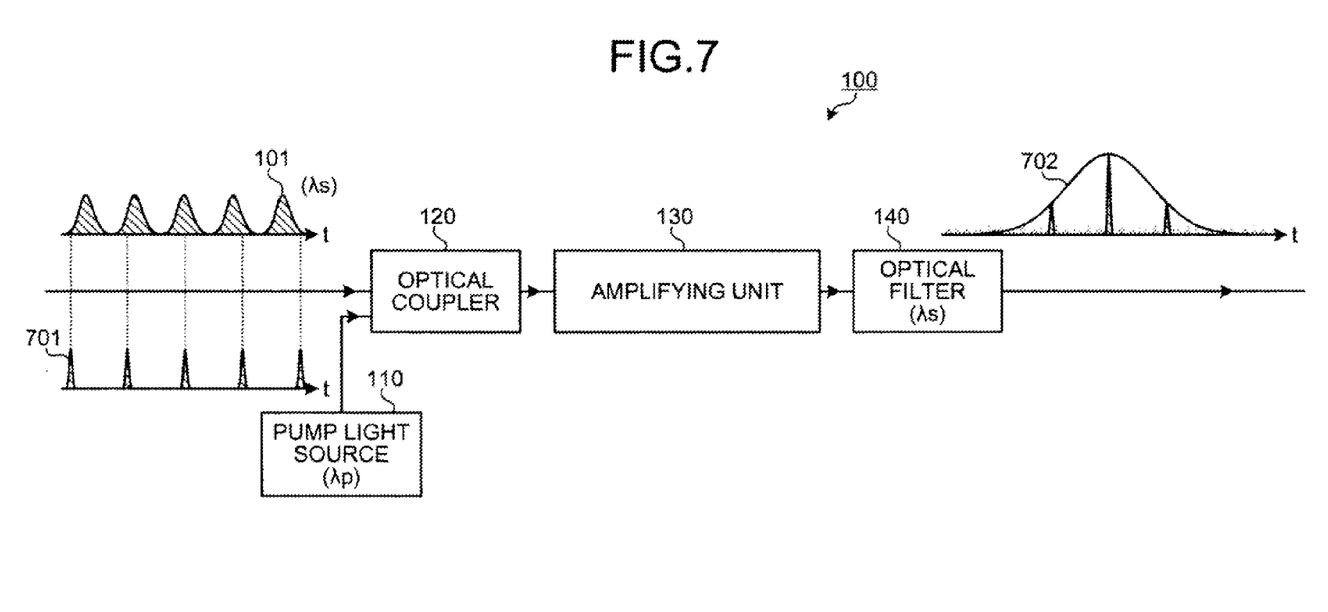
FIG. 7 depicts the optical amplifier according to a sixth embodiment.

FIG. 7 depicts the optical amplifier according to a sixth embodiment. In FIG. 7, components identical to those depicted in FIG. 1 are omitted from the description and are given the same numerical references used in FIG. 1. As depicted in FIG. 7, the pump light source 110 of the optical amplifier 100 according to the sixth embodiment generates pulsed pump light 701 of a wavelength λp different from that of the signal light 101 and outputs the generated pulsed pump light 701 to the optical coupler 120. The pulsed pump light 701 has a pulse width that is narrower than that of the signal light 101.

The pulsed pump light 701 is pump light of a sampling period different from that of the signal light 101. For example, the pulsed pump light 701 has a slow sampling period relative to the bit rate of the signal light 101. The signal light 101 and the pulsed pump light 701 are input to the optical coupler 120. The optical coupler 120 combines the signal light 101 and the pulsed pump light 701 and outputs the combined light to the amplifying unit 130, thereby enabling the amplifying unit 130 to sample the signal light 101 by the pulsed pump light 701 and output, downstream, signal light 702 obtained by the sampling.

Thus, according to the optical amplifier 100 of the sixth embodiment, optical sampling can be performed by using the pulsed pump light 701 having a pulse width that is narrower than that of the signal light 101 and a sampling period that is different from that of the signal light 101. The optical amplifier 100, which is capable of performing the optical parametric amplification in which increased noise is suppressed, can prevent the deterioration caused by the optical sampling noise.

As described above, the optical amplifier and the optical amplifying apparatus are capable of reducing the idler light included in the light to be amplified by the non-linear optical medium by removing, in the non-linear optical medium, the idler light generated in the non-linear optical medium, which performs the optical parametric amplification. This enables the signal light to be amplified without deterioration.

In the first to the third, the fifth, and the sixth embodiments described above, a polarization control unit may be disposed that controls a relative polarization state of the signal light 101 (signal light 601) and the pump light 102 (pump light 701). The polarization control unit may control the polarization state of the signal light 101 or may control the polarization state of the pump light 102 or may control the polarization state of both of the signal light 101 and the pump light 102. This enables the optical parametric amplification to be performed more efficiently at the amplifying unit 130 or the band transmissive non-linear optical medium 210.

Although in each embodiment described above, description has been made of a case in which the signal light 101 or the signal light 601 to be amplified is an intensity-modulated RZ signal, the signal light 101 or the signal light 601 to be amplified is not limited to the RZ signal and may be, for example, phase-modulated signal light.

Although in the first to the fifth embodiments described above, description has been made of the pump light 102 configured as CW light, the pump light 102 is not limited to CW light and may be, for example, pump light of a clock. In this case, a synchronizing unit may be disposed that causes the clock of the pump light 102 output by the pump light source 110 to synchronize with the signal light 101, enabling the signal light 101 to be amplified without deterioration even if the pump light 102 is a clock.

In each embodiment described above, a modulating unit may be disposed that performs phase-modulation of the pump light 102 (pump light 701) to be input to the optical coupler 120, making it possible to reduce the deterioration of signal light 101 (signal light 601) due to the stimulated Brillouin scattering, enabling the signal light 101 to be amplified without further deterioration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical amplifier that amplifies signal light, comprising:
   a pump light source that outputs pump light of a wavelength different from that of the signal light;
   a combining unit that combines the signal light and the pump light output by the pump light source, to output combined light;
   an amplifying unit that includes
      a first non-linear optical medium that transmits the combined light to amplify the signal light,
      an optical filter that transmits the signal light and the pump light included in the combined light transmitted by the first non-linear optical medium, while removing from the combined light, idler light generated from the signal light and the pump light, and
      a second non-linear optical medium that transmits the combined light transmitted by the optical filter, to amplify the signal light; and
   an extraction filter that extracts the signal light from the light output by the amplifying unit.

2. The optical amplifier according to claim 1, wherein the non-linear optical media have band transmission characteristics that do not transmit the idler light.

3. The optical amplifier according to claim 1, wherein the non-linear optical media have a Bragg grating that does not transmit the idler light.

4. The optical amplifier according to claim 1, wherein the optical filter removes the idler light and the pump light, and transmits light that remains,
   the optical amplifier comprises:
      a second pump light source that outputs pump light of a wavelength different from that of the signal light; and
      a second combining unit that combines the light transmitted by the optical filter and the pump light output by the second pump light source, to output combined light, wherein
   the second non-linear optical medium transmits the combined light output by the second combining unit to amplify the signal light.

5. The optical amplifier according to claim 1, comprising:
a polarization beam splitter that splits the combined light according to its state of polarization and further combines light of each polarized wave, wherein
the amplifying unit transmits the light of each polarized wave split by the polarization beam splitter in opposite directions for input to the polarization beam splitter,
the extraction filter extracts the signal light from the light combined by the polarization beam splitter.

6. The optical amplifier according to claim 5, comprising:
a polarization controller that executes control so that polarization of the light of each polarized wave is constant.

7. The optical amplifier according to claim 1, wherein
optical limiter amplification of the signal light is performed using gain saturation characteristics of optical parametric amplification by the amplifying unit.

8. The optical amplifier according to claim 1, wherein
the pump light source outputs pulsed pump light having a pulse width that is narrower than that of the signal light and a sampling period that is different from that of the signal light.

9. The optical amplifier according to claim 1, wherein
the first and second non-linear optical media are optical fibers of an average zero dispersion wavelength matching or substantially matching the wavelength of the pump light or periodically-poled lithium niobate of the average zero-dispersion wavelength.

10. The optical amplifier according to claim 1, comprising:
a polarization control unit that controls a relative polarization state of the signal light and the pump light to be combined by the combining unit.

11. The optical amplifier according to claim 1, comprising:
a modulating unit that performs phase modulation of the pump light, wherein
the combined unit combines the pump light modulated by the modulating unit and the signal light.

12. The optical amplifier according to claim 1, wherein
the pump light source outputs pump light of a clock as the pump light,
the optical amplifier comprises:
a synchronizing unit that causes the clock of the pump light output from the pump light source to the combining unit to synchronize with the signal light.

13. The optical amplifier according to claim 1, wherein
the amplifying unit removes the idler light by removing the wavelength $2\lambda p-\lambda s$, where the wavelength of the signal light is $\lambda s$ and the wavelength of the pump light is $\lambda p$.

14. An optical amplifying apparatus comprising:
a dispersion medium having dispersion characteristics that expand a pulse width of the signal light;
the optical amplifier according to claim 1 and amplifying the signal light of the pulse width expanded by the dispersion medium; and
an inverse dispersion medium that has dispersion characteristics inverse to those of the dispersion medium and that compresses the pulse width of the signal light amplified by optical parametric amplification performed by the optical amplifier.

* * * * *